(12) United States Patent
Hiddessen et al.

(10) Patent No.: US 7,234,681 B2
(45) Date of Patent: Jun. 26, 2007

(54) SOLENOID VALVE

(75) Inventors: Ralf Hiddessen, Lehrte/Arpke (DE); Roy Diers, Burgwedel (DE); Jan-Peter Ossenbrügge, Burgdorf (DE); Werner Leuschner, Hannover (DE)

(73) Assignee: Nass magnet GmbH, Hannover (DE)

( * ) Notice: Subject to any disclaimer, the term of this patent is extended or adjusted under 35 U.S.C. 154(b) by 10 days.

(21) Appl. No.: 11/063,322

(22) Filed: Feb. 22, 2005

(65) Prior Publication Data

US 2005/0184263 A1 Aug. 25, 2005

(30) Foreign Application Priority Data

Feb. 25, 2004 (DE) .................. 10 2004 009 157

(51) Int. Cl.
*F16K 31/02* (2006.01)

(52) U.S. Cl. ................................. 251/129.15
(58) Field of Classification Search ............ 251/129.15
See application file for complete search history.

(56) References Cited

U.S. PATENT DOCUMENTS

| | | | | |
|---|---|---|---|---|
| 4,351,480 A | * | 9/1982 | Masaki et al. ............... 239/124 |
| 5,895,026 A | * | 4/1999 | Linkner et al. ......... 251/129.15 |
| 6,409,144 B1 | * | 6/2002 | Inami .................... 251/129.15 |

* cited by examiner

*Primary Examiner*—J. Caimer Jacyna
(74) *Attorney, Agent, or Firm*—Muramatsu & Associates

(57) ABSTRACT

The invention relates to a solenoid valve having a coil, a magnet core, an armature, a yoke tube, a pole piece and a valve housing. The sealing and connection between the pole piece and the coil and/or the pole piece and the valve housing is effected by means of respective clamp-cutting edge connections each having a nose-like projection.

8 Claims, 2 Drawing Sheets

SOLENOID VALVE

FIELD OF THE INVENTION

This invention relates to a solenoid valve having a coil, a magnet core, an armature, a yoke tube, a pole piece and a valve housing.

BACKGROUND OF THE INVENTION

When the solenoid valve is assembled, the sealing and connection between the pole piece and the coil and/or the pole piece and the valve housing is normally effected using an O-ring which has been inserted beforehand into a circumferential groove in one of the two components to be connected.

SUMMARY OF THE INVENTION

The object of the invention is to provide a solenoid valve in the case of which the sealing and connection between the pole piece and the coil and/or the pole piece and the valve housing can be produced readily and inexpensively.

The solenoid valve according to the invention basically comprises a coil, a magnet core, an armature, a yoke tube, a pole piece and a valve housing and is distinguished by the fact that the sealing and connection between the pole piece and the coil and/or the pole piece and the valve housing is effected by means of a clamp-cutting edge connection. With this type of connection, additional O-rings can be dispensed with.

According to a preferred embodiment, the pole piece has at least one cutting edge which leads to a deformation of the coil/valve housing when the pole piece is connected to the coil and/or to the valve housing. The cutting edge may be formed, for example, by a projection on the pole piece, which projection leads to a deformation of the coil/valve housing when the pole piece is connected to the coil and/or to the valve housing.

According to one embodiment, the coil has a coil body and the pole piece has a tube portion, the tube portion being introduced into the coil body and being used to guide the armature, and the clamp-cutting edge connection being provided between the coil and the tube portion.

According to the connection of the invention, the air gap provided between the magnet core and the armature can be adjusted by means of the clamp-cutting edge connection between the pole piece and the valve housing.

Owing to the use of a pole tube, which is introduced into the coil, the stability of the coil can be increased so that its wall can be constructed to be correspondingly thinner. Advantageously, the coil is not wound until the pole tube has been introduced into the coil. The pole tube also facilitates the transition of the magnetic field lines to the armature.

Further advantages and forms of the invention are explained in more detail hereinafter with reference to the description and the drawings.

DETAILED DESCRIPTION OF THE INVENTION

Figure 1:
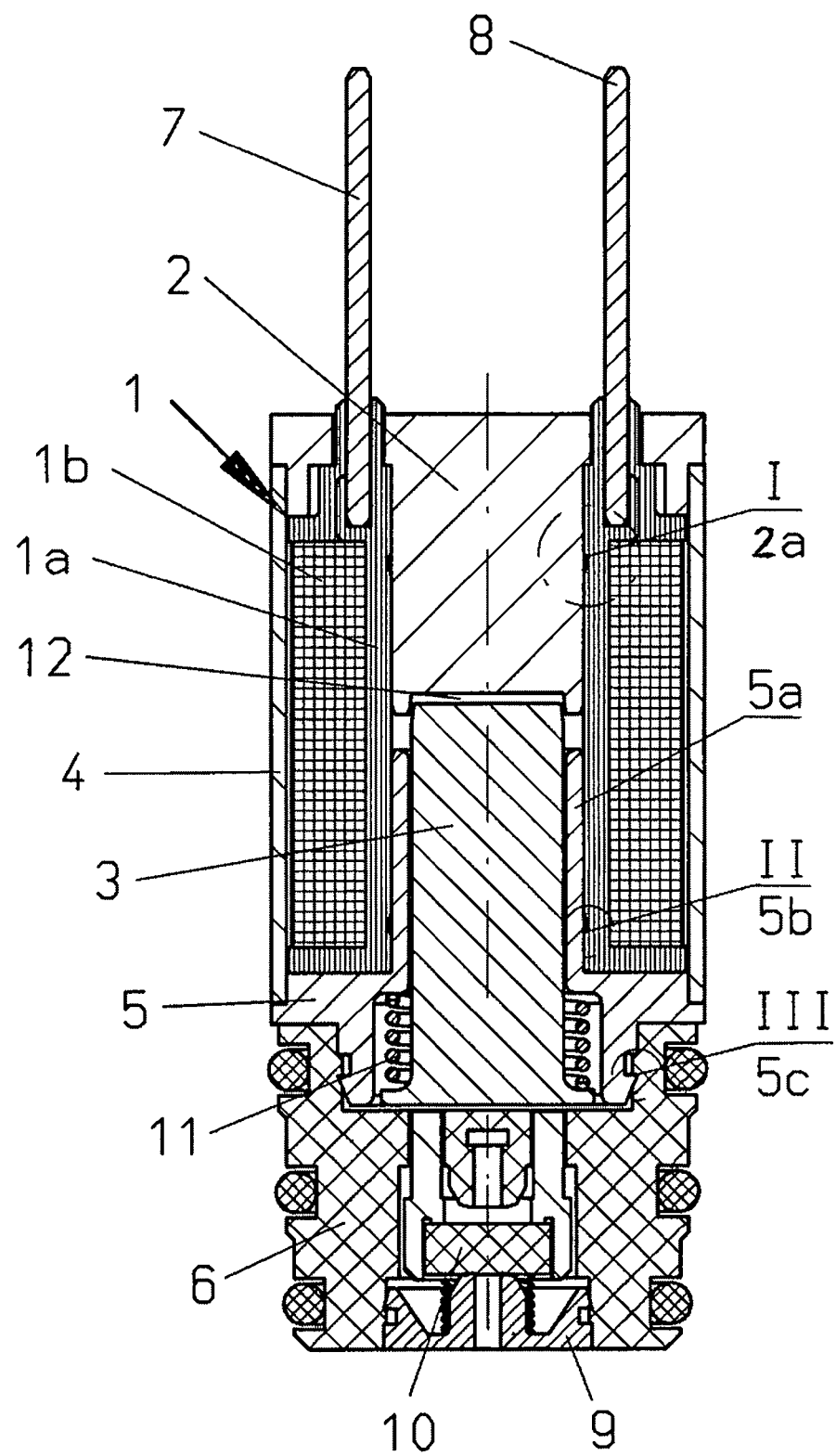
FIG. 1 is a diagrammatic cross sectional view of the solenoid valve.

The solenoid valve shown in the drawings basically comprises a coil 1, a magnet core 2, an armature 3, a yoke tube 4, a pole piece 5 and a valve housing 6. The coil 1 is composed in a conventional manner of a coil body 1a and a winding 1b. The ends of the winding wire are guided to the outside by way of two connecting pins 7, 8.

At the production stage, the magnet core 2 and the yoke tube 4 or the pole piece 5 and the yoke tube 4 can be constructed in one piece.

The pole piece 5 has a tube portion 5a which is introduced into the coil body 1a and which is used to guide the armature 3. The pole piece 5 is also used as an interface with respect to the valve housing 6. The pole piece is part of the magnetic circuit and improves the transition of the field lines to the armature.

A valve seat 9 known per se and a sealing member 10 cooperating therewith are provided in the valve housing 6. When the coil 1 is in the currentless state, the sealing member 10 is urged by the armature 3 onto the valve seat 9 by means of a spring 11. When the coil 1 is excited, the armature 3 is attracted by the magnet core 2 so that the sealing member is lifted from the valve seat 9.

Figure 2:
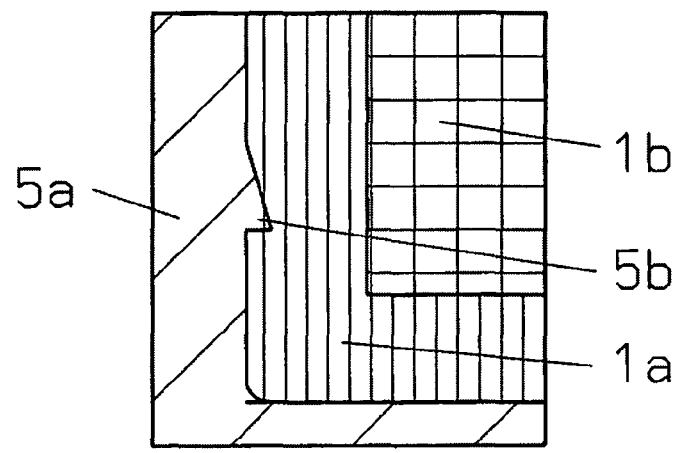
FIG. 2 is a detailed cross sectional view at a portion II in FIG. 1 showing the connection between the pole piece and the coil.

The clamp-cutting edge connection (first clamp-cutting edge connection) between the tube portion 5a of the pole piece 5 and the coil will now be explained in more detail hereinafter with reference to FIG. 2. The tube portion 5a has a projection 5b which is nose-like in cross section and which forms a cutting edge. The cutting edge extending over the entire circumference leads to a deformation of the coil body 1a when the tube portion 5a is introduced into the coil. The cutting edge is in a form such that introduction is facilitated but withdrawal is obstructed. With this type of connection it is especially advantageous if the tube portion comprises metal and the coil body 1a of the coil comprises plastics material.

Figure 4:
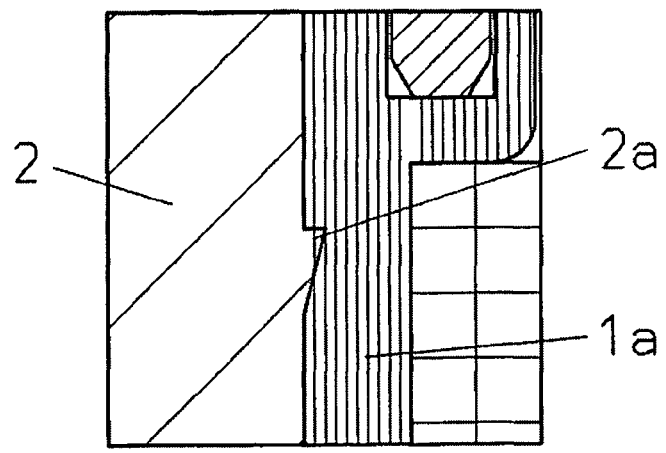
FIG. 4 is a detailed cross sectional view at a portion I in FIG. 1 showing the connection between the armature and the coil.

A similar connection (second clamp-cutting edge connection) is provided in FIG. 4 between the magnet core 2 and the coil body 1a. However, the cross sectionally nose-like projection 2a on the core 2 is here arranged rotated through 180° so that the core is introduced into the coil from above.

Figure 3:
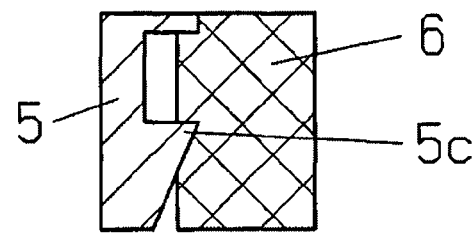
FIG. 3 is a detailed cross sectional view at a portion III in FIG. 1 showing the connection between the pole piece and the valve housing.

The connection between the pole piece 5 and the valve housing 6 is likewise effected with a clamp-cutting edge connection (third clamp-cutting edge connection). FIG. 3 shows an enlarged view of this connection. In this embodiment, the cutting edge is formed by a projection 5c which is approximately hook shaped in cross section. Depending on how far the valve housing 6 is pushed onto the pole piece 5, the air gap 12 between the armature 3 and the core 2 can be adjusted in a controlled manner.

The clamp-cutting edge connection on the one hand fastens the two components against each other and ensures sufficient sealing. Further sealing means (for example O-rings) can be dispensed with.

The sealing and connection between the pole piece and the coil and/or the pole piece and the valve housing and/or the magnet core and the coil can thus be produced readily and inexpensively.

What is claimed is:

1. A solenoid valve comprising:
   a coil with a coil body:
   a magnet core;
   an armature;
   a yoke tube;
   a pole piece having a tube portion; and
   a valve housing;
   wherein said tube portion of the pole piece is introduced into the coil body to guide the armature, and wherein a first clamp-cutting edge connection is provided between the coil body and the tube portion for sealing and connection; and
   wherein the first clamp-cutting edge connection has at least one nose-like projection which leads to a deformation of the coil body when the pole piece is connected to the coil.

2. A solenoid valve according to claim 1, wherein sealing and connection between the magnet core and the coil is also effected by means of a second clamp-cutting edge connection.

3. A solenoid valve according to claim 1, wherein the magnet core and the yoke tube are constructed in one piece.

4. A solenoid valve according to claim 1, wherein the pole piece and the yoke tube are constructed in one piece.

5. A solenoid valve according to claim 1, wherein sealing and connection between the pole piece and the valve housing is also effected by means of a third clamp-cutting edge connection.

6. A solenoid valve according to claim 5, wherein the pole piece has at least one cutting edge which leads to a deformation of the coil/valve housing when the pole piece is connected to the coil and/or to the valve housing.

7. A solenoid valve according to claim 5, wherein the pole piece has at least one cutting edge which is formed by at least one projection and which leads to a deformation of the coil/valve housing when the pole piece is connected to the coil and/or to the valve housing.

8. A solenoid valve according to claim 5, wherein an air gap which can be adjusted by means of the third clamp-cutting edge connection between the pole piece and the valve housing is provided between the magnet core and the armature.

* * * * *